Patented Aug. 28, 1945

2,383,643

UNITED STATES PATENT OFFICE 2,383,643

CATALYTIC DEHYDROGENATION

Stewart C. Fulton and Kenneth K. Kearby, Elizabeth, N. J., assignors to Standard Oil Development Company, a corporation of Delaware No Drawing. Application March 26, 1942,
Serial No. 436,316

15 Claims. (Cl. 260—669)

This invention relates to the catalytic dehydrogenation of hydrocarbons and is more particularly concerned with improved methods of operation and improved catalysts for use therein.

The process of the invention is applicable to the dehydrogenation of low molecular weight hydrocarbons having 2 to 5 carbon atoms, to the dehydrogenation of higher molecular weight hydrocarbons such as ethylbenzene, and especially to the dehydrogenation of low molecular weight olefins.

Processes for converting butane to butene and butene to butadiene are of increasing importance because butene and butadiene are essential raw materials for the preparation of other products. For example, butene is an essential raw material in alkylation processes for the production of isooctane or other high octane number hydrocarbons suitable for use as motor fuels; isobutene is an essential raw material for the preparation of isobutene polymers of various molecular weights; and butadiene is an essential raw material for the production of synthetic rubbers such as Buna-N, Buna-S and Butyl rubber.

In the production of olefins and diolefins by the catalytic dehydrogenation of paraffins and olefins respectively, it is of course desirable to obtain as high a yield of the olefin or diolefin as possible on one passage of the initial material through the dehydrogenation zone and to obtain as small an amount as possible of by-products. It is also desirable to conduct the dehydrogenation under such conditions and in the presence of such catalysts that the formation of coke on the catalysts will be as low as possible. The efficiency of the catalyst is best measured in terms of percent selectivity which means the percent of the total amount of initial material which undergoes conversion which is converted to the desired dehydrogenated product. For example, if 50% of the initial material undergoes conversion in the reaction zone and 30% of this 50% consists of the desired dehydrogenated product, then the percent selectivity would be 60.

We have discovered a new type of catalyst which when used under certain conditions in the dehydrogenation of hydrocarbons makes it possible to obtain substantially greater yields of the desired dehydrogenated product than can be obtained by the use of previously known catalysts. The nature of this new type of catalyst and the conditions under which it is used will be fully understood from the following description:

The new catalysts, as prepared, comprise magnesium oxide as a base material, iron oxide as an active ingredient and a small amount of a promoter which consists of an alkali or alkaline earth fluoride. In addition, the catalyst may contain a small amount of a stabilizer which may consist of an oxide of a metal of the right-hand side (transition series) of groups I, II and III of the periodic system or certain non-acidic oxides which will be described in more detail below. The principal function of the promoter in these catalysts is to promote the dehydrogenating activity of the catalyst.

In these catalysts the magnesium oxide base should constitute the major proportion of the entire catalyst. The following table gives the ranges of the proportions of each component which may be initially present in the catalyst:

| Component | Percent by weight |
|---|---|
| MgO | 50–95 |
| Fe$_2$O$_3$ | 3–49 |
| Promoter | 0.5–10 |
| Stabilizer | 0.5–20 |

Among the alkali and alkaline fluorides which may be used as promoters, the fluorides of potassium and calcium are generally preferred.

The following may be used as stabilizers when needed: oxides of metals of the right hand side (transition series) of groups I, II and III of the periodic system, particularly oxides of copper, silver and zinc; non-acidic transition oxides of chromium, manganese, cobalt and nickel; and non-acidic oxides of thorium, zirconium, cerium, lead, bismuth and aluminum.

One especially effective catalyst of this type has the following approximate initial composition:

| Component | Percent by weight |
|---|---|
| MgO | 74.8 |
| Fe$_2$O$_3$ | 19.0 |
| KF | 1.4 |
| CuO | 4.8 |
| | 100.0 |

This catalyst may be prepared in a number of different ways but one suitable method is as follows:

Magnesia is mixed with a solution of ferric nitrate. Ammonium hydroxide may be added to the mixture to ensure complete precipitation. The magnesia with ferric hydroxide precipitate is washed and then mixed with solutions of copper nitrate and potassium fluoride. The resulting mixture is dried, heated to 1000° F., and then molded into pills or lumps of any suitable size and shape. It will be understood that the proportions of the various materials used in the preparation will be such as to produce a final mixture containing the ingredients in the required amounts. The form in which the catalyst is prepared will of course depend upon whether it is to be used in fixed or stationary form or in finely divided form suspended in the vapors of hydrocarbon to be dehydrogenated.

In carrying out the process using catalysts having the initial composition above described, the hydrocarbon, preferably with steam, is passed over the catalyst at a rate between 50 and 5000, preferably between 100 and 1000 volumes (measured at normal temperature and pressure) of hydrocarbon per volume of catalyst per hour. The ratio of steam to hydrocarbon is between 15:1 and 1:1, preferably from 8: to 4:1. The reaction chamber is maintained at a temperature between 1000 and 1600° F., preferably between 1100 and 1300° F. and under atmospheric, below atmospheric or above atmospheric pressure. The hydrocarbon which passes through the reaction zone unaffected may of course be recycled thereto.

The principal function of the steam is to dilute the hydrocarbon and thus reduce the partial pressure thereof in the reaction zone. At the same time, however, the steam performs another useful function in that it reacts with coke which may be deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 15, 25 or 50 hours or more although it is usually preferable in operation to run for periods of ½ hour to 7 hours and then regenerate. It is found that with these magnesium oxide-iron oxide catalysts, calcium fluoride and potassium fluoride are especially effective in promoting the water gas reaction, i. e., the reaction between coke and steam.

Regeneration of the catalyst may be effected by shutting off the flow of hydrocarbon and passing steam, air, or a mixture of steam and air through the catalyst mass while it is maintained at a temperature between 1100 and 1300° F. Following substantially complete removal of coke from the catalyst in this manner, the flow of hydrocarbon and steam may be resumed.

One particularly effective type of operation using a finely divided, suspended catalyst is that which may be called "fluid catalyst operation." By the term "fluid catalyst operation" is meant that the size of the catalyst particles, the quantity of catalyst, the quantity of hydrocarbon-steam mixture and the linear velocity of the mixture are so adjusted that the entire mass behaves in much the same way as a fluid and may be pumped and circulated through the apparatus like a fluid.

When it is desired to prepare butadiene by the catalytic dehydrogenation of butene in the presence of the catalysts described above, one suitable source of the butene feed is the $C_4$ cut of the gases obtained in the thermal or catalytic cracking of hydrocarbon oils. A normal butene fraction may be obtained from the $C_4$ cut by selective extraction or absorption. Unreacted butene in the product may be similarly purified prior to recycling.

The following example illustrates the effectiveness of potassium fluoride as a promoter for a magnesium oxide-iron oxide catalyst:

A catalyst consisting of 78.5 parts by weight of magnesium oxide, 20 parts by weight of iron oxide, 5 parts by weight of copper oxide and 1.5 parts by weight of potassium fluoride is used for the dehydrogenation of butene at a temperature of 1200° F., a butene feed rate of 800 v./v./hour and a steam rate of 7 volumes of steam per volume of butene. The percent conversion obtained is 50, the percent of butadiene obtained is 29 and the percent selectivity is 58. The percent of coke obtained is 0.5 and the percent of $CO+CO_2$ in the product is 5.3.

Experimental data is obtained on a large number of different oxides which may be used as stabilizers indicate that a diverse class of oxides is beneficial. In general, non-acidic oxides such as those of copper, thorium, cobalt, manganese, chromium, aluminum, zinc, lead, zirconium, silver, cerium and bismuth may be used. It is found that acidic oxides such as those of vanadium, tin, phosphorus, titanium, molybdenum and tungsten are definitely harmful. Chlorides in general are also found to be harmful.

This invention is not limited by any theories of the mechanism of the reactions nor by any details which have been given merely for purposes of illustration but is limited only in and by the following claims in which it is intended to claim all novelty inherent in the invention.

We claim:

1. An improved process for the catalytic dehydrogenation of hydrocarbons which comprises passing the hydrocarbons over a catalyst comprising a major proportion of magnesium oxide, a minor proportion of iron oxide, and a small amount of a promoter selected from the class consisting of the fluorides of alkali and alkaline earth metals.

2. An improved process for the catalytic dehydrogenation of low molecular weight hydrocarbons which comprises passing the hydrocarbons with steam over a catalyst comprising a major proportion of magnesium oxide, a minor proportion of iron oxide and a small amount of a promoter selected from the class consisting of the fluorides of alkali and alkaline earth metals.

3. An improved process for the catalytic dehydrogenation of low molecular weight hydrocarbons which comprises passing the hydrocarbons with steam over a catalyst comprising a major amount of magnesium oxide, a minor proportion of iron oxide, a small amount of a promoter selected from the class consisting of the fluorides of alkali and alkaline earth metals and a small amount of a stabilizer selected from the class consisting of non-acidic oxides of metals other than the alkali and alkaline earth metals.

4. Process according to claim 2 in which the promoter is potassium fluoride.

5. Process according to claim 3 in which the promoter is potassium fluoride and the stabilizer is copper oxide.

6. Process according to claim 2 in which the catalyst comprises from 50 to 95% by weight of magnesium oxide, from 3 to 49% by weight of iron oxide and from 0.5 to 10% by weight of the promoter.

7. Process according to claim 3 in which the catalyst comprises from 50 to 95% by weight of magnesium oxide, from 3 to 49% by weight of iron oxide, from 0.5 to 10% by weight of the promoter and from 0.5 to 20% by weight of the stabilizer.

8. Process according to claim 1 in which the catalyst comprises approximately 78.5% by weight of magnesium oxide, 20% by weight of iron oxide and 1.5% by weight of a fluoride of a metal selected from the class consisting of the alkali and alkaline earth metals.

9. Process according to claim 3 in which the catalyst comprises 50–95% by weight of magnesium oxide, 3–49% by weight of iron oxide, 0.5–10% by weight of a fluoride of a metal selected from the class consisting of alkali and alkaline earth metals, and 0.5–20% by weight of a non-acetic oxide of a metal other than the alkali and alkaline earth metals.

10. An improved process for the catalytic dehydrogenation of butene which comprises passing the butene over a catalyst comprising a major proportion of magnesium oxide, a minor proportion of iron oxide, and a small amount of a fluoride of a metal selected from the class consisting of the alkali and alkaline earth metals.

11. An improved process for the catalytic dehydrogenation of ethylbenzene which comprises passing the ethylbenzene over a catalyst comprising a major proportion of magnesium oxide, a minor proportion of iron oxide and a small amount of a fluoride of a metal selected from the class consisting of the alkali and alkaline earth metals.

12. An improved process for the catalytic dehydrogenation of butene which comprises passing the butene with steam over a catalyst comprising a major proportion of magnesium oxide, a minor proportion of iron oxide, and a small amount of a fluoride of a metal selected from the class consisting of the alkali and alkaline earth metals.

13. An improved process for the catalytic dehydrogenation of butene which comprises passing the butene with steam over a catalyst comprising a major proportion of magnesium oxide, a minor proportion of iron oxide, a small amount of a fluoride of a metal selected from the class consisting of alkali and alkaline earth metals, and a small amount of a non-acidic oxide other than the oxides of metals of the alkali and alkaline earth groups.

14. Process according to claim 12 in which the catalyst comprises from 50 to 95% by weight of magnesium oxide, from 3 to 49% by weight of iron oxide and from 0.5 to 10% by weight of potassium fluoride.

15. Process according to claim 13 in which the catalyst comprises from 50 to 95% by weight of magnesium oxide, from 3 to 49% by weight of iron oxide, from 0.5 to 10% by weight of potassium fluoride, and from 0.5 to 10% by weight of a non-acidic oxide other than the oxides of metals of the alkali and alkaline earth groups.

STEWART C. FULTON.
KENNETH K. KEARBY.